United States Patent [19]

Hoffman et al.

[11] Patent Number: 4,751,426

[45] Date of Patent: Jun. 14, 1988

[54] FLUORESCENT LAMP USING MULTI-LAYER PHOSPHOR COATING

[75] Inventors: Mary V. Hoffman, Cleveland Heights; Gustino J. Lanese, Chesterland, both of Ohio

[73] Assignee: General Electric Company, Schenectady, N.Y.

[21] Appl. No.: 929,130

[22] Filed: Nov. 10, 1986

[51] Int. Cl.[4] .......................... H01J 1/62; H01J 63/04
[52] U.S. Cl. ..................................... 313/487; 313/486
[58] Field of Search ................................ 313/486, 487

[56] References Cited

U.S. PATENT DOCUMENTS

| | | | |
|---|---|---|---|
| 3,937,988 | 2/1976 | De Clue et al. | 307/208 |
| 4,075,532 | 2/1978 | Piper et al. | 313/387 |
| 4,088,923 | 5/1978 | Manders | 313/487 |
| 4,423,349 | 12/1983 | Nakajima et al. | 313/487 |
| 4,583,026 | 4/1986 | Kajiwara et al. | 313/486 |

Primary Examiner—Theodore M. Blum
Attorney, Agent, or Firm—Philip L. Schlamp; Edward M. Corcoran; J. F. McDevitt

[57] ABSTRACT

A fluorescent lamp utilizing a dual layer phosphor coating is disclosed wherein the base layer utilizes a first phosphor mixture and the top phosphor layer in said coating comprises a blend of narrow bandwith emitting phosphors to improve the color rendering capability of these lamps.

14 Claims, 1 Drawing Sheet

U.S. Patent  Jun. 14, 1988  4,751,426
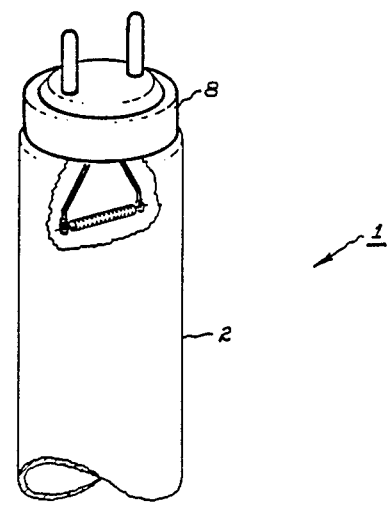
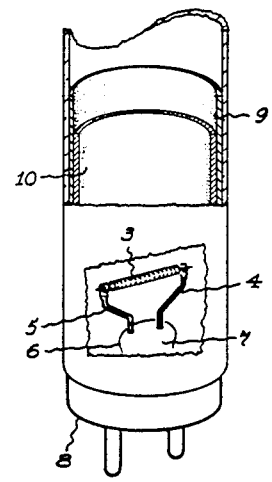

FLUORESCENT LAMP USING MULTI-LAYER PHOSPHOR COATING

RELATED PATENT APPLICATION

In U.S. Pat. Ser. No. 4,623,816 and assigned to the assignee of the present invention there is disclosed a blended phosphor mixture for use in a fluorescent lamp to provide white color illumination at improved light output and good color rendition. Said phosphor admixture comprises a lanthanum cerium orthophosphate phosphor combined with a trivalent europium-activated yttrium oxide phosphor which can further contain a blue color emission phosphor when utilized in a low pressure type fluorescent lamp. Additionally, said phosphor mixture can also be utilized as the top layer in a dual layer phosphor coating which employs a conventional calcium haloapatite phosphor as the base layer. A more fully detailed description of said phosphor materials as contained in said copending application is hereby specifically incorporated by reference in the present specification by reason of utilizing said phosphors in the present improvement.

BACKGROUND OF THE INVENTION

Fluorescent lamps utilizing a dual phosphor layer of different phosphors to produce a high lumen output together with good color rendition are well known. This invention deals with a particular dual phosphor layer improvement in fluorescent lamps to provide these desired results more effectively than found in conventional lamps. More particularly, the present dual phosphor fluorescent lamps provides still higher luminous efficacy without appreciably sacrificing CRI (Color Rendering Index) values.

Efficient illumination along with good color rendition is now provided in fluorescent lamps with various combinations of three narrow band emitting phosphor materials each selectively producing red, blue or green color emission. For example, there is disclosed in U.S. Pat. No. 3,937,998 a combination of said type phosphor materials found useful in low pressure type mercury vapor discharge lamps wherein the blue color emission phosphor exhibits an emission band in the wavelength range from about 430 nanometers wavelength up to about 490 nanometers wavelength, the red color emission phosphor exhibits an emission band in a wavelength range from about 590 nanometers wavelength up to about 630 nanometers wavelength, and with the green color emission phosphor producing emission extending from about 520 nanometers wavelength up to about 565 nanometers wavelength, said phosphor combination producing efficient white color illumination. In U.S. Pat. No. 4,088,923 there is also disclosed a particular utilization of said phosphor combination as a top layer in a dual layer phosphor coating which is said to reduce the cost of these relatively expensive phosphor materials in a fluorescent lamp. Specifically, a thin layer of this tri-phosphor combination can be deposited on the surface of a conventional calcium haloapatite phosphor material to produce the desired high light output with good color rendition at a considerable cost savings for the overall phosphor combination.

Various other narrow band emitting phosphor materials which are relatively less expensive than the above referenced high cost phosphors can also be employed in this type phosphor combination. For example, a green color emitting terbium-activated lanthanum cerium orthophosphate phosphor is disclosed in U.S. Pat. No. 4,423,349 as a lower cost substitute for the terbium and cerium coactivated magnesium aluminate phosphor component in said phosphor combination. Similarly, a lower cost europium-activated strontium chloroapatite phosphor can be substituted for europium-activated barium magnesium aluminate phosphor to serve as the narrow band blue color emission phosphor component in a different phosphor combination used to provide efficient white color illumination in a fluorescent lamp. Specifically, the latter type phosphor coating is disclosed in U.S. Pat. No. 4,075,532 wherein the improved coating comprises a first phosphor having a relatively broad emission spectrum with a mean wavelength in the yellow portion of the visible spectrum which is blended with a second phosphor having said relatively narrow emission spectrum in a blue portion of the visible spectrum and with said first and second phosphors being uniformly blended together in a proportional relationship preselected to provide increased luminous efficacy for said mixture. Although the color rendering capability for the latter phosphor mixture has been found commercially acceptable, it is recognized to be significantly lower than that achieved with the conventional calcium haloapatite phosphor material.

It is a principal object of the present invention, therefore, to provide still further improved white color illumination in fluorescent lamps than achieved in the conventional lamps.

It is another important object of the present invention to provide higher output white color illumination in fluorescent lamps without appreciably sacrificing CRI values.

Other objects of the present invention will become apparent to those skilled in the art upon considering the detailed description hereinafter provided.

SUMMARY OF THE INVENTION

It is now been discovered that the above-mentioned desirable results can be achieved in a fluorescent lamp having a dual layer phosphor coating which utilizes a combination of two phosphor mixtures. More particularly, a first phosphor mixture is deposited as a base layer on the inner glass surface of the lamp glass envelope to produce a preselected white color point, said first phosphor mixture utilizing the phosphor combination more fully disclosed in the aforementioned 4,075,532 patent and which is hereby specifically incorporated by reference in the present specification. As therein disclosed, said first phosphor mixture comprises a phosphor providing yellow color emission having the general formula:

$$Ca_{10-w-x-y}Cd_wMn_xSb_y(PO_4)_6F_{2-y}O_y$$

wherein
w is in the approximate range 0.0–0.2,
x is in the approximate range 0.25–0.50, and
y is in the approximate range 0.02–0.20
being blended with a phosphor having a relatively narrow emission spectrum in a blue portion of the visible spectrum at proportions achieving said desired white color point. The second phosphor mixture in the present dual layer phosphor coating and which is deposited as a top layer on the surface of said base phosphor layer comprises a blend of narrow bandwith emitting phosphors blended in proportions to achieve approximately the same white color point as exhibited by the first phosphor mixture or a lower white color point but imparting higher CRI values to the overall lamp emission. As previously indicated, said narrow bandwith emitting phosphors in the second phosphor mixture include a blue color emission phosphor exhibiting an emission band in the wavelength region from about 430 nanometers wavelength up to about 490 nanometers wavelength, a green color emission phosphor exhibiting an emission band extending from about 520 nanometers wavelength up to about 565 nanometers, and the red color emission phosphor exhibiting an emission band in the wavelength range from about 590 nanometers wavelength up to about 630 nanometers wavelength. In the preferred embodiments, the phosphor having a relatively narrow emission spectrum in a blue portion of visible spectrum for use in the first phosphor mixture can be selected from divalent europium-activated strontium chloroapatite and divalent europium-activated barium magnesium aluminate. Correspondingly, the second phosphor mixture in the preferred embodiments can comprise divalent europium-activated barium magnesium aluminate phosphor, terbium and cerium-coactivated magnesium aluminate phosphor and trivalent europium-activated yttrium oxide.

In especially preferred embodiments of the present invention, the tri-phosphor blend being employed as the top layer in the dual layer phosphor coating utilizes lower cost phosphor materials to reduce the overall phosphor costs in said lamps. More particularly, a lower cost europium activated strontium chloroapatite phosphor is substituted as the blue color emission component for the conventional europium-activated barium magnesium aluminate phosphor whereas another lower cost terbium-activated lanthanum cerium orthophosphate phosphor is substituted for the conventional terbium and cerium coactivated magnesium aluminate phosphor component in the present second phosphor mixture. A representative 40 watt size T12 fluorescent lamp of this type employs a top tri-phosphor layer having approximately 13.4 weight percent of said divalent europium-activated strontium chloroapatite phosphor, approximately 37.3 weight percent of said terbium-activated lanthanum cerium orthophosphate phosphor, and approximately 49.3 weight percent of said trivalent europium activated yttrium oxide phosphor, said phosphor mixture exhibiting a white color point of 4100° K. Said top phosphor layer is deposited on a base layer of the hereinbefore defined first phosphor mixture also exhibiting a 4100° K. white color point to produce lamp emission at the same white color. A different representative 32 watt size T8 fluorescent lamp utilizes approximately 4.7 weight percent of said divalent europium-activated strontium chloroapatite phosphor, approximately 27.5 weight percent of said terbium-activated lanthanum cerium orthophosphate phosphor, and approximately 67.8 weight percent of said trivalent europium activated yttrium oxide phosphor in the top phosphor layer which exhibits a white color point at approximately 3000° K. Depositing said phosphor mixture on the above defined 4100° K. first phosphor mixture produces lamp emission at approximately 3500° K.

BRIEF DESCRIPTION OF THE DRAWING

In the accompanying drawing, there is shown a perspective view partially broken away of a low pressure mercury discharge fluorescent lamp construction utilizing a dual layer phosphor coating in accordance with the present invention.

DESCRIPTION OF THE PREFERRED EMBODIMENTS

Referring to the accompanying drawing, there is depicted a representative fluorescent lamp 1 comprising an elongated soda-lime silicate glass envelope 2 having a circular cross-section. The low pressure mercury discharge assembly in said lamp includes a conventional electrode structure 3 at each end connected to lead-in wires 4 and 5 which extend through a glass press seal 6 in a mount stem 7 to the electrical contacts of a base 8 fixed at both ends of the sealed glass envelope. The discharge sustaining filling in the sealed glass envelope is an inert gas such as argon or a mixture of argon and other rare earth gases at a low pressure in combination with a small quantity of mercury to provide the low vapor pressure manner of lamp operation. The inner surface of the glass bulb is provided with a phosphor coating 9 utilizing the first phosphor mixture according to the present invention to provide a preselected white color point. Deposited on the surface of said phosphor base layer 9 is a top phosphor layer 10 utilizing the second phosphor mixture also according to the present invention primarily as a means to increase the CRI values for the overall white color lamp emission. As specific embodiments further describing the present lamp improvement, a number of the above described fluorescent lamp constructions were built and tested for comparison with prior art lamps using conventional phosphor materials in the same type lamp construction. Both type lamps included an optically transparent tin oxide conductive layer deposited on the glass surfaces as a starting aid.

EXAMPLE I

Lamps according to the present invention exhibiting a 4100° K. color point were built utilizing the known F40T12WM construction and having approximately 1.6 grams of a tri-phosphor blend being superposed on an approximately 4.0 gram deposit of the first phosphor mixture. Said top tri-phosphor blend consisted of approximately 13.4 weight percent of a commercial divalent europium-activated strontium chloroapatite phosphor, approximately 37.3 weight percent of a commercial terbium-activated lanthanum cerium orthophosphate phosphor, and approximately 49.3 weight percent of trivalent europium-activated yttrium oxide phosphor said phosphor mixture exhibiting an approximate 4100° K. white color point. The first phosphor mixture being utilized as a base layer combined approximately 95 weight percent of the hereinbefore described yellow color emission calcium haloapatite phosphor with 5 weight percent of divalent europium-activated strontium chloroapatite phosphor to achieve the same 4100° K. white color point. Said test lamps measured 3495 lumens after 100 hour burning at a CRI value of 73. The conventional dual layer phosphor coated lamps tested for comparison employed the same above defined top layer phosphor blend at a coating weight of approximately 0.9 grams which had been deposited on a 5.5 gram weight coating of conventional cool white type calcium haloapatite phosphor. Said conventional lamps measured 3312 lumens after 100 hours burning at a CRI value of 73. As can be noted from said comparison, a higher light output is obtained with the present dual layer phosphor coating and without sacrificing CRI values despite a lower total phosphor coating weight having been employed.

EXAMPLE II

Fluorescent lamps having a T-8 type construction at a 32 watt size were constructed for a further comparison between the present dual layer phosphor coating and a prior art dual layer phosphor coating exhibiting the same approximate 3500° K. white color point. Said prior art dual phosphor coating utilized 3.6 grams of a white color single calcium haloapatite phosphor exhibiting a 3500° K. white color point on which was deposited 1.1 grams of a phosphor mixture having the same white color point. Said phosphor mixture utilized approximately 8.0 weight percent divalent europium-activated strontium chloroapatite phosphor, approximately 27.5 weight percent terbium-activated lanthanum cerium orthophosphate phosphor, and approximately 64.5 weight percent of trivalent europium-activated yttrium oxide phosphor. The presently improved dual layer phosphor coating utilized 0.9 gram of said tri-phosphor blend for the top surface layer but blended in different weight proportions to exhibit a 3000° K. white color point. Said tri-phosphor mixture in the present dual layer phosphor coating utilized approximately 4.7 weight percent of the divalent europium-activated strontium chloroapatite phosphor, approximately 27.5 weight percent of the terbium-activated lanthanum cerium orthophosphate phosphor, and approximately 67.8 weight percent of the trivalent europium activated yttrium oxide phosphor. This top phosphor layer was deposited upon approximately 3.7 grams of the same first phosphor mixture defined in the preceding example and exhibiting a white color point at approximately 4100° K. The presently improved lamps measured 2945 lumens after 100 hours burning at a 75 CRI value as compared with 2898 lumens and a 80 CRI value being measured on said prior art lamps.

It will be apparent from the foregoing description that while specific examples have been provided on representative lamps used in the practice of the present invention, that various modifications thereof can be made within the spirit and scope of the present invention. For example, the proportions of phosphor constituents in both the first and second phosphor mixtures according to the present invention will vary other than above specified when different lamp color points are desired. Additionally, it is further contemplated to introduce still other constituents in the top and bottom layers of the presently improved phosphor coating for various fluorescent lamp applications in order to achieve still further desired improvements. It is intended to limit the present invention, therefore, only by the scope of the following claims.

What we claim as new and desire to secure by letters Patent of the United States is:

1. In a fluorescent lamp comprising a glass envelope having electrodes at its ends, a mercury and inert gas filling within said envelope, and a phosphor coating deposited on the interior suface of said glass envelope, the improvement wherein said phosphor coating comprises a dual layer of a first phosphor mixture deposited as a layer on the inner glass surface and a second phosphor mixture deposited as a layer on the first phosphor layer, said first phosphor mixture comprising a phosphor providing yellow color emission having the general formula:

$$Ca_{10-w-x-y}Cd_wMn_xSb_b(PO_4)_6F_{2-y}O_y$$

wherein
w is in the approximate range of 0.0–0.2
x is in the approximate range 0.25–0.50, and
y is in the approximate range 0.02–0.20
being blended with a phosphor having a relatively narrow blue color emission of from about 430–490 nanometers wavelength in an amount sufficient to achieve a white color point of about 4100° K., wherein said second phosphor mixture comprises a mixture of (i) a blue color emission phosphor exhibiting an emission band in the wavelength region from about 430 nanometers wavelength up to about 490 nanometers wavelength, (ii) a green color emission phosphor exhibiting an emission band extending from about 520 nanometers wavelength up to about 565 nanometers wavelength, and (iii) a red color emission phosphor exhibiting an emission band in the wavelength range from 590 nanometers wavelength up to about 630 nanometers wavelength, said second phosphor mixture achieving approximately the same white color point or a lower white color point than exhibited by the first phosphor mixture to provide higher luminous efficacy without appreciably sacrificing CRI values than similar lamps wherein the first phosphor layer comprises only a conventional cool white calcium halophosphate phosphor which has not been blended with a phosphor having said relatively narrow blue color emission.

2. A lamp as in claim 1 wherein the phosphor having relatively narrow blue color emission is selected from divalent europium-activated strontium chloroapatite phosphor and divalent europium-activated barium magnesium aluminate phosphor.

3. A lamp as in claim 1 wherein the second phosphor mixture comprises divalent europium-activated barium magnesium aluminate phosphor, terbium and cerium-coactivated magnesium aluminate phosphor, and trivalent europium-activated yttrium oxide.

4. A lamp as in claim 1 wherein the second phosphor mixture comprises divalent europium-activated strontium chloroapatite phosphor, terbium-activated lanthanum cerium orthophosphate phosphor, and trivalent europium-activated yttrium oxide.

5. A lamp as in claim 1 wherein the green color emission phosphor has the general formula:

$$La_{1-x-y}Ce_xTb_yPO_4$$

wherein
x is in the approximate range 0.05–0.60, and
y is in the approximate range 0.05–0.20.

6. A lamp as in claim 1 wherein the red color emission phosphor has the general formula:

$$(Y_{1-a}Eu_a)_2O_3$$

wherein
a is in the approximate range 0.015–0.040.

7. In a fluorescent lamp comprising a tubular shaped glass envelope having electrodes at its ends, a mercury and inert gas filling which produces a low pressure discharge of ultraviolet radiation, and a phosphor coating deposited on the interior surface of said glass envelope which converts a substantial portion of said ultraviolet radiation to visible illumination having a white color, the improvement wherein said phosphor coating comprises a dual layer of a first phosphor mixture deposited as a layer on the inner glass surface and a second phosphor mixture deposited as a layer on the first phosphor layer, said first phosphor mixture comprising a phosphor having the general formula:

$$Ca_{10-w-x-y}Cd_wMn_xSb_y(PO_4)_6F_{2-y}O_y$$

wherein
  w is in the approximate range 0.0–0.2
  x is in the approximate range 0.25–0, and
  y is in the approximate range 0.02–0.20
being blended with a phosphor having a relatively narrow blue color emission spectrum of from about 430–490 nanometers wavelength in an amount sufficient to achieve a white color point of about 4100° K., wherein said second phosphor mixture comprises a blend of divalent europium-activated strontium chloroapatite phosphor, terbium-activated lanthanum cerium orthophsophate phosphor, and trivalent europium-activated yttrium oxide exhibiting approximately the same white color point or lower white color point than exhibited by the first phosphor mixture to provide higher luminous efficacy without appreciably sacrificing CRI values than similar lamps wherein the first phosphor layer comprises only a conventional cool white calcium halophosphate phosphor which has not been blended with a phosphor having said relatively narrow blue color emission.

8. A lamp in claim 7 wherein the phosphor having relatively narrow blue color emission is selected from divalent europium-activated strontium chloroapatite and divalent europium-activated barium magnesium aluminate.

9. A lamp as in claim 7 wherein said lanthanum cerium orthophosphate phosphor has the general formula:

$$La_{1-x-y}Ce_xTb_yPO_4$$

wherein
  x is the approximate range 0.05–0.60, and
  y is in the approximate range 0.05–0.20.

10. A lamp as in claim 7 wherein said trivalent europium-activated yttrium oxide phosphor has the general formula:

$$(Y_{1-a}Eu_a)_2O_3$$

wherein
  a is in the approximate range 0.015–0.040.

11. A lamp as in claim 7 wherein the first phosphor mixture utilizes approximately 89–96% by weight of said yellow color emission phosphor and approximately 4–11% by weight of said phosphor having said relatively narrow blue color emission spectrum.

12. A lamp as in claim 7 wherein the second phosphor mixture utilizes approximately 13.4 weight percent of said divalent europium-activated strontium chloroapatite phosphor, approximately 37.3 weight percent of said terbium-activated lanthanum cerium orthophosphate phosphor, and approximately 49.3 weight percent of said trivalent europium activated yttrium oxide phosphor to achieve a 4100° K. lamp color point.

13. A lamp as in claim 7 wherein the second phosphor mixture utilizes approximately 4.7 weight percent of said divalent europium-activated strontium chloroapatite phosphor, approximately 27.5 weight percent of said terbium-activated lanthanum cerium orthophosphate phosphor, and approximately 67.8 weight percent of said trivalent europium-activated yttrium oxide phosphor to achieve a 3500° K. lamp color point.

14. A lamp as in claim 2 wherein the first phosphor mixture utilizes approximately 89–96% by weight of said yellow color emission phosphor and approximately 4–11% by weight of said phosphor having said relatively narrow blue color emission spectrum.

* * * * *